(12) United States Patent
Hsu et al.

(10) Patent No.: US 7,683,264 B2
(45) Date of Patent: Mar. 23, 2010

(54) HIGH PRESSURE, HIGH CURRENT, LOW INDUCTANCE, HIGH RELIABILITY SEALED TERMINALS

(75) Inventors: John S. Hsu, Oak Ridge, TN (US); John W. McKeever, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 356 days.

(21) Appl. No.: 11/844,544

(22) Filed: Aug. 24, 2007

(65) Prior Publication Data

US 2008/0066957 A1   Mar. 20, 2008

Related U.S. Application Data

(60) Provisional application No. 60/826,142, filed on Sep. 19, 2006.

(51) Int. Cl.
 *H01B 17/26* (2006.01)
(52) U.S. Cl. ............... 174/152 GM; 174/650; 174/50.52; 174/50.61; 174/151; 174/135; 439/488
(58) Field of Classification Search ......... 174/650–662, 174/151, 152 GM, 50.52, 50.59, 50.61, 50.63, 174/135, 17.05; 439/926, 935, 488, 491; 156/91
See application file for complete search history.

(56) References Cited

U.S. PATENT DOCUMENTS

| | | | |
|---|---|---|---|
| 4,580,003 A | 4/1986 | Bowsky et al. | |
| 4,584,433 A | 4/1986 | Bowsky et al. | |
| 4,702,976 A | 10/1987 | Bowsky et al. | |
| 4,707,424 A | 11/1987 | Bowsky et al. | |
| 4,739,551 A | 4/1988 | Bowsky et al. | |
| 4,984,973 A | 1/1991 | Itameri-Kinter et al. | |
| 5,091,605 A | 2/1992 | Clifford | |
| 5,471,015 A | 11/1995 | Paterek et al. | |
| 5,493,073 A | 2/1996 | Honkomp | |
| 5,557,073 A * | 9/1996 | Truesdale et al. | 174/151 |
| 5,780,771 A | 7/1998 | Beckwith et al. | |
| 6,362,424 B1 | 3/2002 | Honkomp et al. | |
| 6,509,525 B2 | 1/2003 | Honkomp et al. | |
| 6,632,104 B2 | 10/2003 | Quadir | |
| 6,794,574 B2 * | 9/2004 | Gust et al. | 174/650 |
| 6,844,502 B2 * | 1/2005 | Deng et al. | 174/151 |
| 7,241,178 B2 * | 7/2007 | Schaffner | 439/660 |
| 7,399,923 B2 * | 7/2008 | Tenyakov | 174/74 R |

* cited by examiner

*Primary Examiner*—Dhiru R Patel
(74) *Attorney, Agent, or Firm*—Jospeh A. Marasco

(57) ABSTRACT

The invention is a terminal assembly having a casing with at least one delivery tapered-cone conductor and at least one return tapered-cone conductor routed there-through. The delivery and return tapered-cone conductors are electrically isolated from each other and positioned in the annuluses of ordered concentric cones at an off-normal angle. The tapered cone conductor service can be AC phase conductors and DC link conductors. The center core has at least one service conduit of gate signal leads, diagnostic signal wires, and refrigerant tubing routed there-through. A seal material is in direct contact with the casing inner surface, the tapered-cone conductors, and the service conduits thereby hermetically filling the interstitial space in the casing interior core and center core. The assembly provides simultaneous high-current, high-pressure, low-inductance, and high-reliability service.

6 Claims, 4 Drawing Sheets

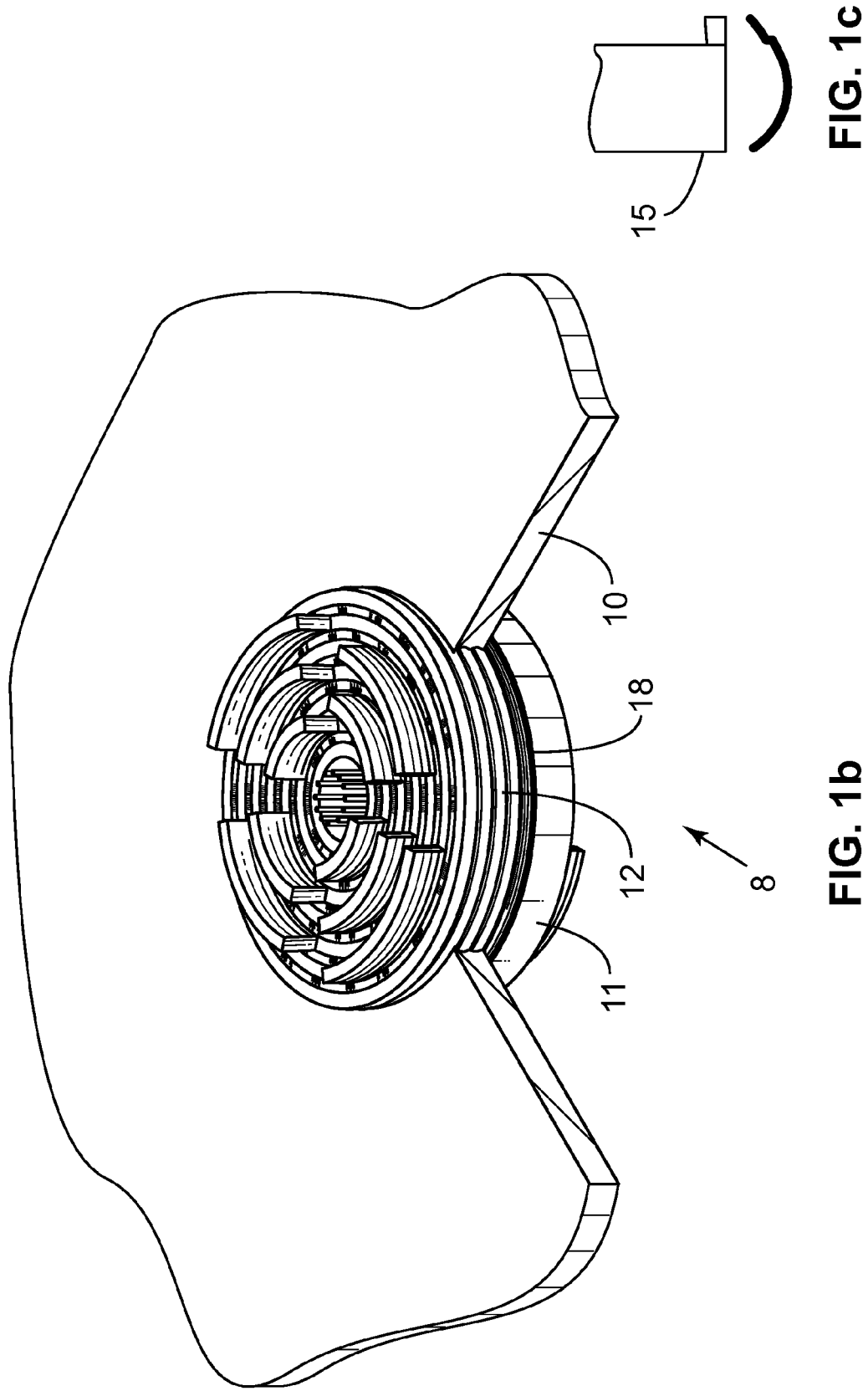

HIGH PRESSURE, HIGH CURRENT, LOW INDUCTANCE, HIGH RELIABILITY SEALED TERMINALS

CROSS-REFERENCE TO RELATED APPLICATIONS

This application claims priority to U.S. Provisional Patent Application 60/826,142 filed Sep. 19, 2006, herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

FIELD OF THE INVENTION

The field of the invention relates to sealed terminal assemblies and more particularly to structure for a more durable terminal assembly having simultaneous high-current, high-pressure, low-inductance, and high-reliability features.

BACKGROUND OF THE INVENTION

There are many sealed electrical terminals currently available but none of them addresses the seals for simultaneous high-current, high-pressure, low-inductance, and high-reliability features. For example, there are millions of hermetic electrical compressors that use Kovar-clad copper terminals for relatively low current (less than 100 amperes) operations. For the high current terminals such as the Paul Clifford's "Fire-Proof Seals" of U.S. Pat. No. 5,091,605, Feb. 25, 1992 which presented "a fire proof seal for a tubular conduit (16) of thermally conductive material adapted to contain an elongated member (24) extending axially outside the conduit, the seal comprising a thermally conductive sleeve (34) surrounding the member externally of the conduit and in thermal contact with an external flange (40) of the conduit, and a thermally fusible material (30) surrounding the member within the conduit, whereby, in the event of a fire in the vicinity of the member externally of the conduit, heat is transmitted through the sleeve into the conduit so as to fuse the thermally fusible material and block the interior of the conduit". Clifford's invention does not function during normal service conditions because his seal is only formed by the heat during a fire. Furthermore, this fire-triggered seal is not suitable for high-pressure difference across the seal other than the pressure difference caused by the fire, which is very low as compared to the high-pressure that can easily reach several hundred pounds per square inch in pressure vessel seals.

Because the high-pressure liquid and vapor inside the hermetic container are not allowed to leak out through the high-pressure, high-electrical-current terminals under a wide range of temperatures, the seal must be extremely reliable at all times. Another problem with the existing sealed terminals is the high flux leakage reactance. Because of the high currents going through the terminals, the magnetic flux links the conductors. Consequently, the magnetic flux produces leakage reactance that can harm the performance of the electrical circuit connected to the terminals. Thus, there is a defined need for sealed terminal assembly technology simultaneously meeting the high-pressure, high-electric-current, low-inductance, and high-reliability requirements.

BRIEF DESCRIPTION OF THE INVENTION

The invention is a terminal assembly having a casing with an inner surface, an outer surface, an interior core, and a center core. The interior core has at least one delivery tapered-cone conductor and at least one return tapered-cone conductor routed there-through. The delivery and return tapered-cone conductors are electrically isolated from each other and positioned in the annuluses of ordered concentric cones at an off-normal angle. The normal angle is considered perpendicular to the hermetic container. The tapered cone conductor service is selected from the group consisting of AC phase conductors and DC link conductors. The center core has at least one service conduit selected from the group consisting of gate signal leads, diagnostic signal wires, and refrigerant tubing routed there-through. A seal material is in direct contact with the casing inner surface, the tapered-cone conductors, and the service conduits thereby hermetically filling the interstitial space in the casing interior core and center core.

BRIEF DESCRIPTION OF THE DRAWINGS

FIGS. 1a, 1b and 1c show a side view, end view, and interlocking schematic of one embodiment of the invention.

DETAILED DESCRIPTION OF THE INVENTION

Figure 1A:
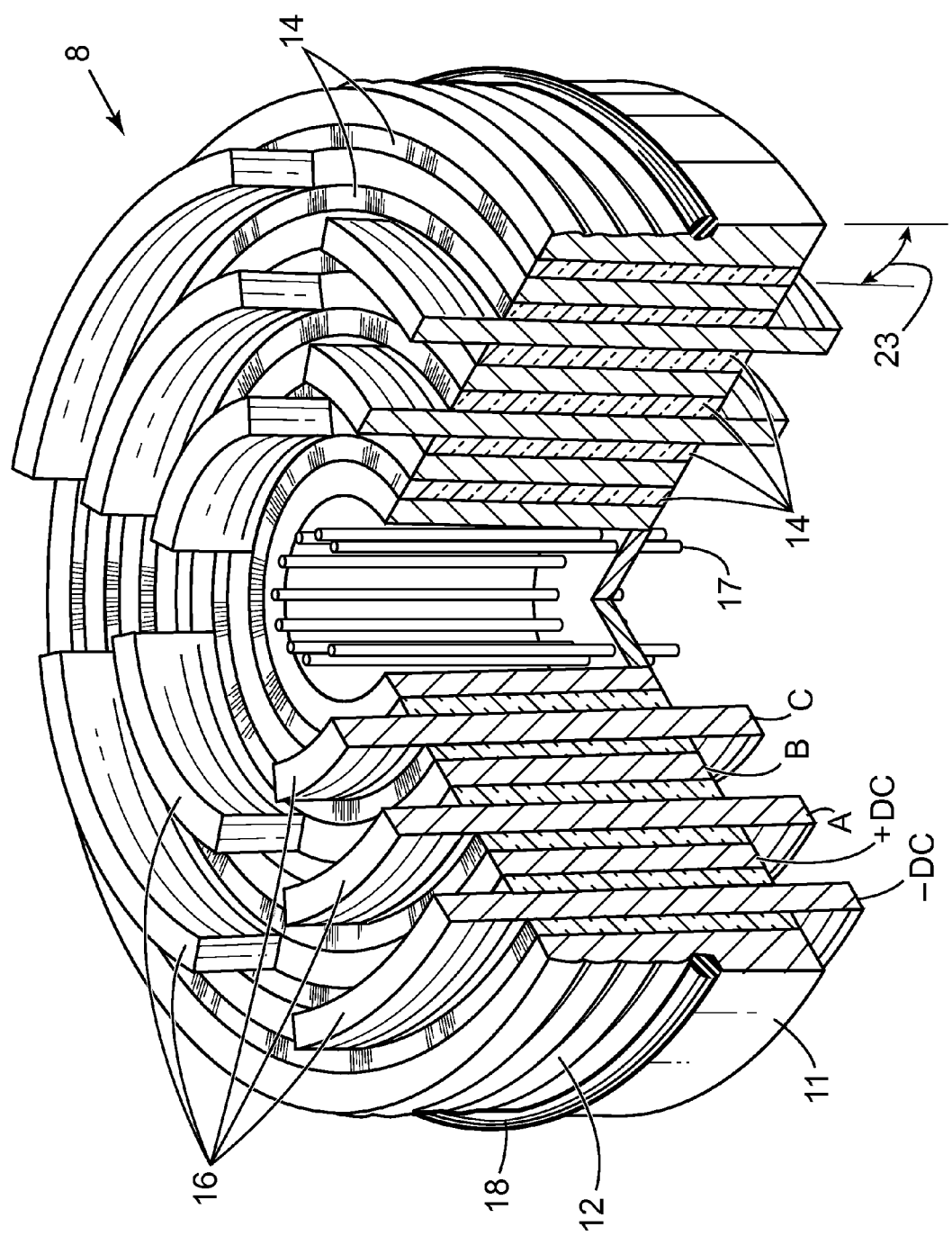

FIGS. 1a and 1b show a sample embodiment of the terminal assembly 8. High pressure inside the hermetic container 10 exerts an outward force to the annular, tapered-cone-conductors 16 penetrating at an off-normal angle 23. The off-normal angle 23 can be between approximately 1° and 45°. The normal angle is considered perpendicular to the hermetic container. The pressure inside the hermetic container produces a compression on the sealing material 14 between the tapered-cone conductors 16. The tapered cone conductors 16 service is selected from the group consisting of AC phase conductors (labeled A, B, and C in is FIGS. 1a, 1b, 2a, and 2b) and DC link conductors (labeled DC+ and DC− in FIGS. 1a, 1b, 2a and 2b). These typically supply the AC and DC primary power source for any power electronics device positioned inside the hermetic container. The center core has at least one service conduit 17 selected from the group consisting of gate signal leads, diagnostic signal wires, and refrigerant tubing 28 routed there-through. The gate and diagnostic signals are typically part of the control system for a power electronics device positioned inside the hermetic container. The refrigerant tubing (FIG. 2a) routes refrigerant into and out of the hermetic container. The higher the pressure inside the hermetic container, the better the seal. The coefficient of thermal expansion (CTE) of the sealing material 14 is matched with the CTE of the tapered-cone conductors 16. The sealing material 14 can be made of at least one material selected from the group consisting of glass, ceramic, and porcelain enamel. The sealing material 14 can also be made of a mixture of at least one polymer and at least one material selected from the group consisting of graphite fibers, ceramic powder, glass powder, glass, porcelain enamel, ceramic, and glass fibers. An example of CTE-matched conductor and sealing material is a copper alloy conductor and a special glass mixture sealing material manufactured by Ferro called EG-3608.

The delivery and return tapered-cone conductors 16 are positioned in the annuluses of ordered concentric cones in the assembly 8. The tapered-cone conductors 16 have their ends partially cut off as shown in FIG. 1b thereby providing sufficient space for making contact with separate mating socket conductors (not shown). The summed total current in the tapered-cone conductors 16 is therefore zero and the relatively thin sealing material 14 between the tapered-cone conductors 16 does not allow a significant amount of circulating flux. This results in low leakage reactance of the tapered-cone conductors 16. The tapered off-normal angle 23 of the tapered-cone conductors 16 is calculated to balance shear and compressive strengths of the sealing material 14. Gate and sensor signals 17 are fed through the center core of the terminal assembly 8.

The socket (not shown) for the tapered-cone conductors 16 can be made with single or multiple split options for easy handling. Various interlocking arrangements, such as L-shape terminal interlocking as shown in FIG. 1c, are used to catch the mating socket conductor. The terminal assembly casing 11 can be mounted to the hermetic container 10 wall using threads 12 and a seal 18 such as an O-ring.

Figure 2A:
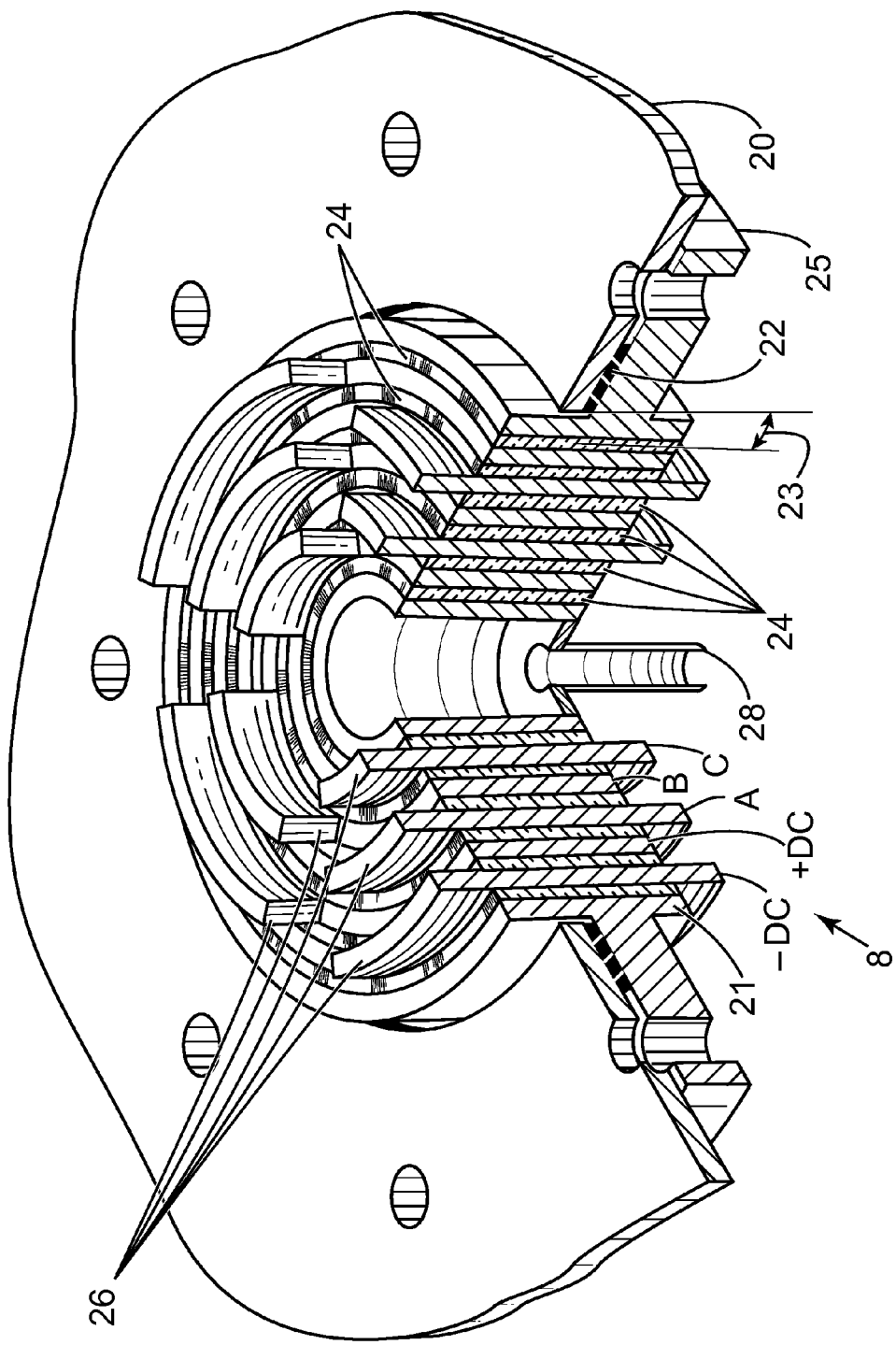
FIGS. 2a and 2b is a side and end view schematic of another embodiment of the invention.
Figure 2B:
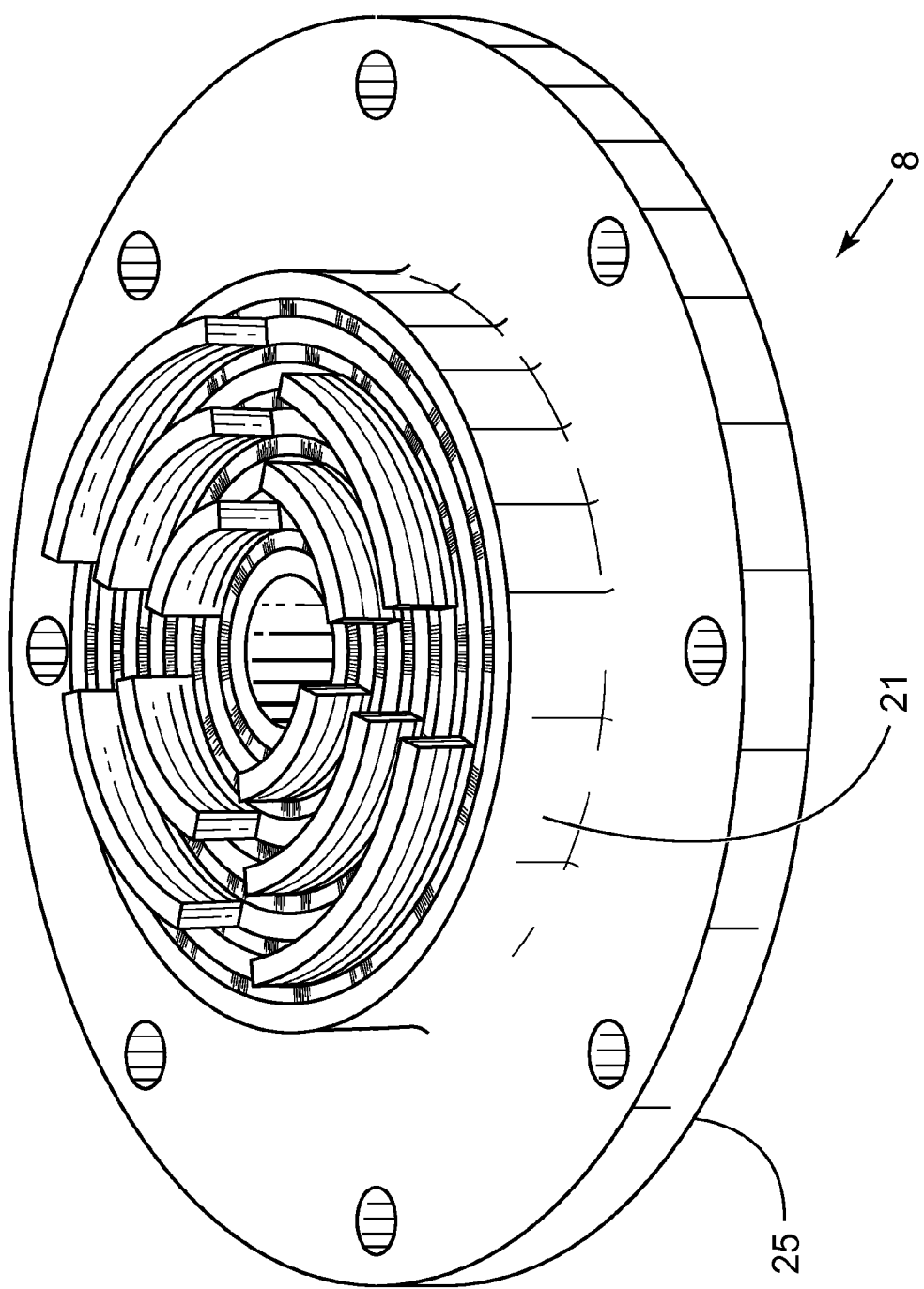

FIG. 2 shows another embodiment of the invention with the liquid/vapor line 28 located at the center core of the terminal assembly. The terminal assembly casing 21 can be mounted to the hermetic container 20 wall by bolting a mounting member, such as a flange 25, to the hermetic container 20 and using a seal 22 as shown in FIG. 2a.

While there has been shown and described what are at present considered the preferred embodiments of the invention, it will be obvious to those skilled in the art that various changes and modifications can be made therein without departing from the scope.

We claim:

1. A terminal assembly comprising:
 a casing having an inner surface, an outer surface, an interior core, and a center core, said casing defining an interstitial space in said casing interior core and said center core, said interior core having at least one annular delivery tapered-cone conductor and at least one annular return tapered-cone conductor routed there-through, said delivery and return tapered-cone conductors electrically isolated from each other and positioned in annuluses of ordered concentric cones at an off-normal angle between 1 degree and 45 degrees, wherein said tapered cone conductor service is selected from the group consisting of alternating current phase conductors and direct current link conductors, said center core having at least one service conduit selected from the group consisting of gate signal leads, diagnostic signal wires, and a refrigerant tubing routed there-through; and a sealing material in direct contact with said casing inner surface, said tapered-cone conductors, and said service conduit thereby hermetically filling said interstitial space.

2. The terminal assembly of claim 1 further comprising a mounting member in contact with said casing outer surface for mounting said casing to a hermetic container.

3. The terminal assembly of claim 2 wherein said mounting member further comprises a bolted flange and a seal.

4. The terminal assembly of claim 1 wherein said sealing material further comprises at least one material selected from the group consisting of glass, ceramic, and porcelain enamel.

5. The terminal assembly of claim 1 wherein said sealing material further comprises a mixture of at least one polymer and at least one material selected from the group consisting of graphite fibers, ceramic powder, glass powder, glass, porcelain enamel, ceramic, and glass fibers.

6. The terminal assembly of claim 1 wherein said casing further comprises threads.

* * * * *